United States Patent
Wier (10) Patent No.: US 6,732,966 B2
(45) Date of Patent: May 11, 2004

(54) BELT SPOOL

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/191,899

(22) Filed: Jul. 9, 2002

(65) Prior Publication Data

US 2003/0010858 A1 Jan. 16, 2003

(30) Foreign Application Priority Data

Jul. 10, 2001 (DE) .................... 201 11 409 U (51) Int. Cl.⁷ .............................. B60R 22/28
(52) U.S. Cl. ............... 242/376; 242/379.1; 242/587.1
(58) Field of Search ............... 242/376, 379.1, 242/587.1; 280/805, 806; 297/478

(56) References Cited

U.S. PATENT DOCUMENTS

| | | | | |
|---|---|---|---|---|
| 5,613,647 A | * | 3/1997 | Dybro et al. | 242/376 |
| 5,722,611 A | * | 3/1998 | Schmid et al. | 242/376 |
| 5,984,223 A | * | 11/1999 | Hiramatsu | 242/379.1 |
| 6,202,957 B1 | * | 3/2001 | Bannert et al. | 242/376 |
| 6,209,816 B1 | * | 4/2001 | Hitomi et al. | 242/322 |
| 6,336,606 B1 | * | 1/2002 | Smithson et al. | 242/379.1 |
| 6,405,962 B1 | * | 6/2002 | Hirase | 242/379.1 |
| 2002/0190151 A1 | * | 12/2002 | Bell et al. | 242/376 |

FOREIGN PATENT DOCUMENTS

| | | |
|---|---|---|
| DE | 3828070 A1 | 11/1989 |
| DE | 19733343 A1 | 2/1999 |
| DE | 29906629 U1 | 10/1999 |
| EP | 0962365 A2 | 12/1999 |
| WO | WO0121455 A1 | 3/2001 |
| WO | WO0121456 A1 | 3/2001 |

* cited by examiner

*Primary Examiner*—John M. Jillions
(74) *Attorney, Agent, or Firm*—Tarolli, Sundheim, Covell & Tummino L.L.P.

(57) ABSTRACT

A belt spool for a belt retractor comprises a torsion rod and a spool body that has a recess in which is provided a shaped part by means of which an end of a safety belt can be fastened in the recess. The shaped part rests at the torsion rod in order to be supported when the shaped part is stressed by a tensile load of the safety belt. There is also proposed a belt retractor including such a belt spool.

20 Claims, 9 Drawing Sheets

BELT SPOOL

TECHNICAL FIELD

The invention relates to a belt spool for a belt retractor, comprising a torsion rod and a spool body that has a recess in which is provided a shaped part by means of which an end of a safety belt can be fastened in the recess. The invention also relates to a belt retractor comprising such a belt spool.

BACKGROUND OF THE INVENTION

DE 296 05 115 discloses such a belt spool in which the shaped part is supported on the recess in the body of the belt spool Therefore, the spool body of the belt spool has to be stable enough to be able to absorb the tensile load of the safety belt.

It is the object of the invention to provide a simple and lightweight belt spool.

BRIEF SUMMARY OF THE INVENTION

According to the invention, a belt spool for a belt retractor comprises a torsion rod and a spool body that has a recess in which is provided a shaped part by means of which an end of a safety belt can be fastened in the recess. The shaped part rests at the torsion rod in order to be supported when the shaped part is stressed by a tensile load of the safety belt. In this manner, the torsion rod can absorb the tensile load of the safety belt. However, the spool body of the belt spool no longer has to be as stable as a spool body that has to withstand the entire tensile load of the safety belt. This results in considerable weight savings since, first of all, a lighter material can be used for the spool body and secondly, a smaller diameter can be selected for the spool body According to a preferred embodiment, the torsion rod has two hub sections with which it engages the spool body, and an axle section that connects the two hub sections to each other, the shaped part being only supported on the torsion rod at the hub sections. In this manner, the tensile load of the safety belt is only applied to the torsion rod at the hub sections, so that the torsion rod is prevented from bending, which would impair the primary function of the torsion rod, namely, to delimit the belt force. Via the hub sections, however, the torsion rod can transfer the load to the belt spool with a relatively short path, and from here, the force is absorbed by the bearings of the housing of the belt retractor.

Moreover, the invention proposes a belt retractor comprising a safety belt and an above-mentioned belt spool, an end of the safety belt forming a loop that surrounds the shaped part. Such a belt retractor can be made smaller since the space requirement for the wound-up belt is reduced in the case of a belt spool the spool body of which has a smaller diameter.

Additional advantageous embodiments of the invention will be apparent from the subordinate claims.

DETAILED DESCRIPTION OF THE PREFERRED EMBODIMENTS

Figure 1:
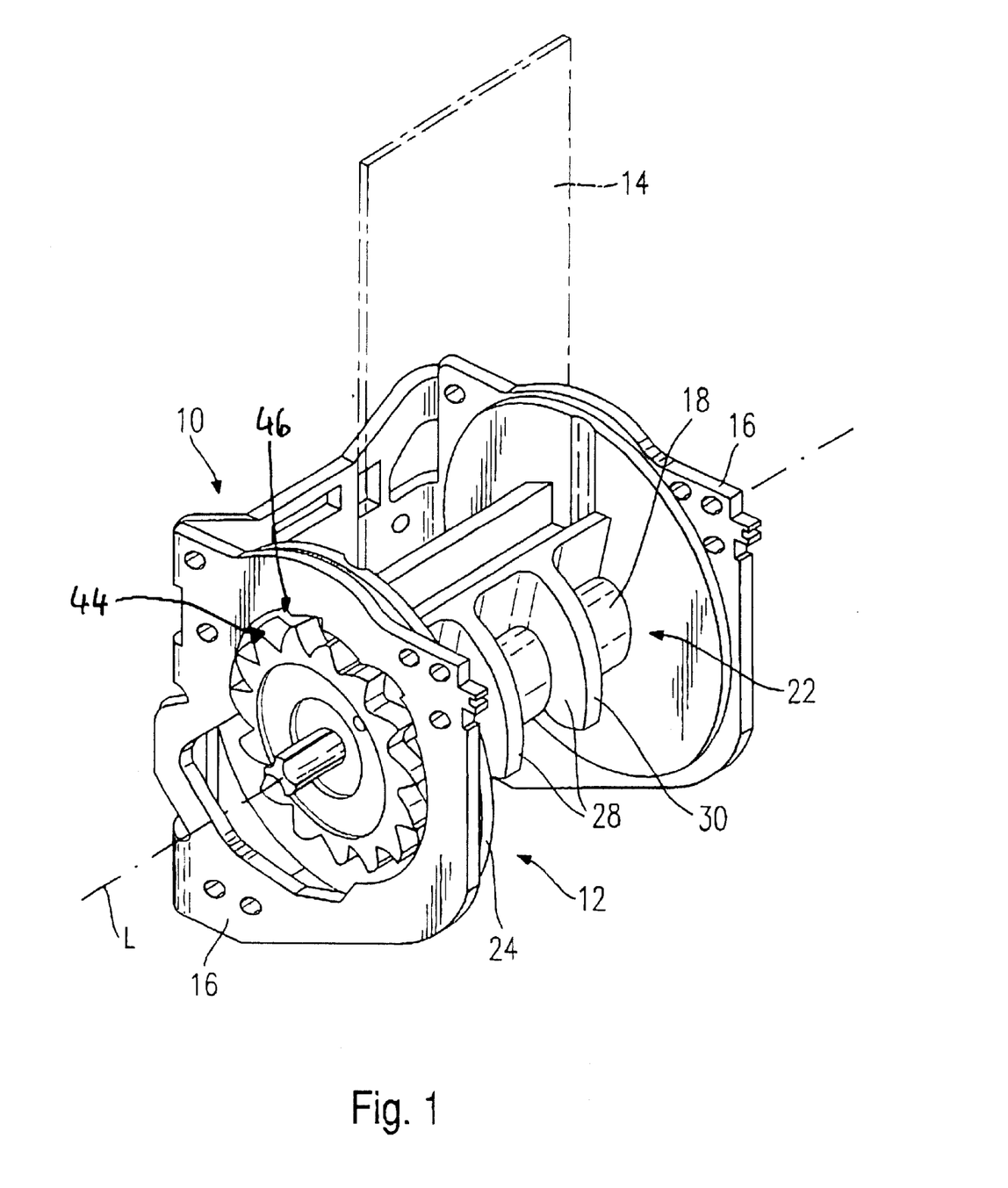
FIG. 1 is a perspective view of a first embodiment of a belt retractor according to the invention.

FIG. 1 shows a frame 10 of a belt retractor according to the invention in which a belt spool 12 for a safety belt 14 is mounted For purposes of providing a better overview, the components of the belt retractor that are not necessary for the description of the invention have been left out. The frame 10 consists of U-shaped bent sheet metal comprising a back wall and two side walls 16, between which the belt spool 12 is mounted.

The belt spool 12 has a spool body 18, a middle axis L and a first flange 22 at one end and a second flange 24 at the opposite end The spool body is provided with a cavity 20 (FIG. 3) that is traversed by the axis L. The spool body 18 consists of a cylindrical base body 26 that surrounds the cavity 20 and has an outside which is provided with ribs 28 that are configured in such a way that the outer contour of the spool body 18 forms a drum surface 30 on which the safety belt 14 can be wound up. This configuration of the ribs 28 allows a saving of material and, thus, a weight saving at the specified diameter of the belt spool.

Figure 2:
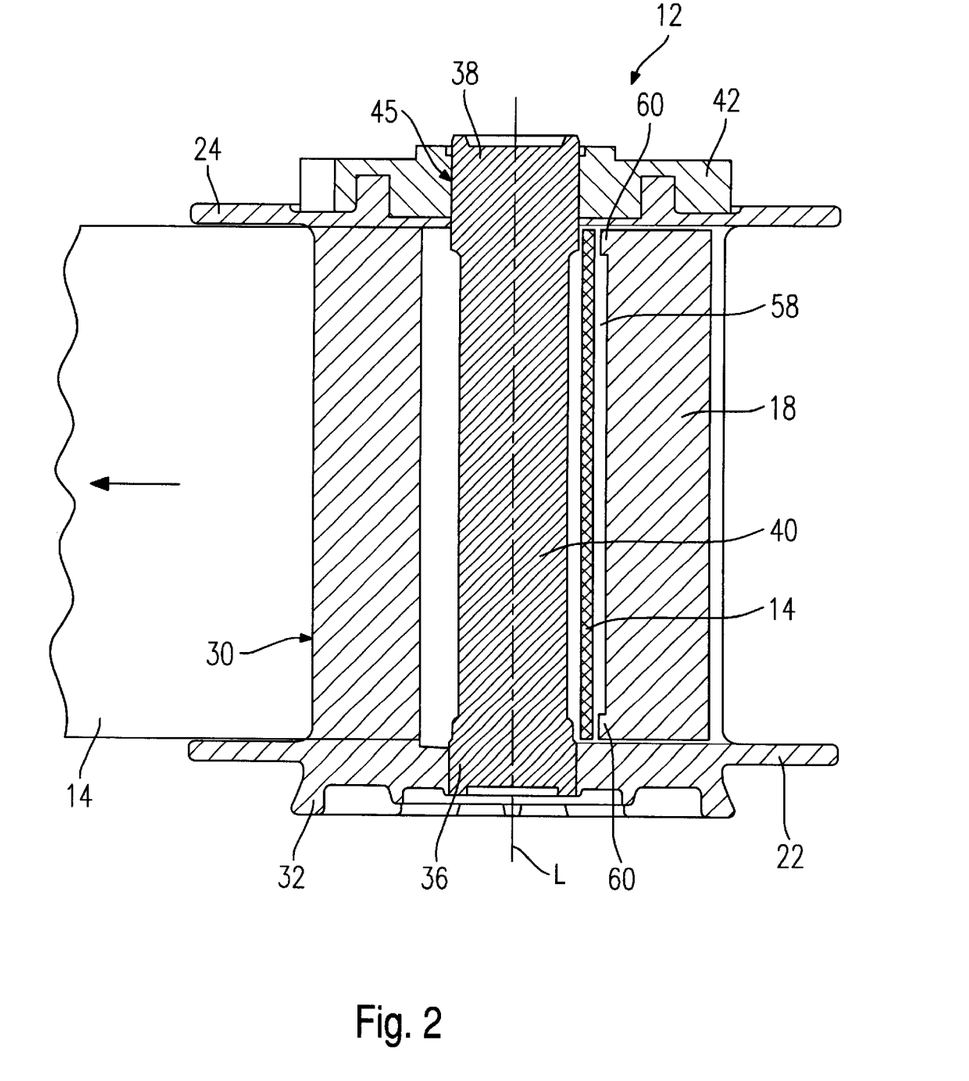
FIG. 2 shows a lengthwise section through the belt spool of the belt retractor of FIG. 1.

The side of the first flange 22 facing away from the spool body 18 is provided with a cylindrical protuberance 32 that is concentric to the axis L and with which the belt spool 12 is mounted so that it can rotate in an opening in one of the side walls 16 of the frame 10. The cavity 20 of the spool body 18 is penetrated by a torsion rod 34 having two hub sections 36 and 38 with which the torsion rod 34 engages the spool body 18, and an axle section 40 that connects the two hub sections with each other. The first hub section 36 non-rotatably engages the first flange 22. A locking wheel 42 that is provided with teeth 44 is non-rotatably attached to the second hub section 38, for example, by means of toothing 45. Thus, the torsion rod 34 can perform the function of delimiting the belt force in the known manner in that the teeth 44 of the locking wheel 42 engage into recesses 46 on the frame 10, while the belt spool 12 can continue to turn due to the tensile force of the safety belt 14 under torsion of the torsion rod 34, a process in which the safety belt 14 is unwound.

As can be seen in FIGS. 4 through 7, a recess 50, in which there is arranged a shaped part 52, is provided in the spool body 18. An end 53 of the safety belt 14 forms a loop 54 that surrounds the shaped part 52 The loop 54 can be formed in various ways, for example, by sewing, fusing or gluing the end 53 to the safety belt 14 at one or more connection sites 55. Radially opposite the recess 50, there is a slot 56 in the spool body 18 through which the safety belt 14 can emerge. Here, the safety belt 14 runs in an open space 58 between the torsion rod 34 and the spool body 18 past the torsion rod 34. The size of the open space 58 is selected in such a way that the loop 54 can easily be inserted through, but the shaped part 52 cannot pass through.

Consequently, when a tensile force acts upon the safety belt 14 (see arrow in FIGS. 4 through 7), the shaped part 52 cannot be pulled into the open space 58 Therefore, it is supported on the torsion rod 34 so that the latter absorbs most of the tensile load from the safety belt 14 Advantageously, the shape of the recess 50 is selected in such a way that a shaped part 52 with a polygonal cross-section (FIGS. 5 through 7) can only tip slightly as a result of the tensile force of the safety belt, thereby largely avoiding a wedging effect in the open space 58 between the torsion rod 34 and the spool body 18.

The following features are of importance in designing the belt spool. The line through the point S (intersection point of the center line of recess 50 with the circumferential line of the belt spool) and the point L (center line of the belt spool) has to intersect the cross-section of the shaped part 52 or at least has to form a tangent to the circumference The distance between the line S–L and a parallel tangent to the circumference of the shaped part has to be larger than 1 mm here, and the slot 56 for the exit of the safety belt is arranged so as to be at least approximately diametrically opposed to the recess 50. The imaginary center line of the slot for the exit of the safety belt is rotated with respect to the line S–L by at least 120°.

If the belt system is not provided with a belt deflector, the projected supporting width of the shaped part 52 is at least 5.5 mm with a strength of the shaped part of 900 N/mm². In case of a lower strength, the projected supporting width is at least 7 mm. If on the other hand the belt system is provided with a belt deflector, the minimum supporting width of the shaped part 52 is at least 7 mm with a strength of 900 N/mm². In case of a lower strength, the projected width is at least 9 mm.

Figure 6:
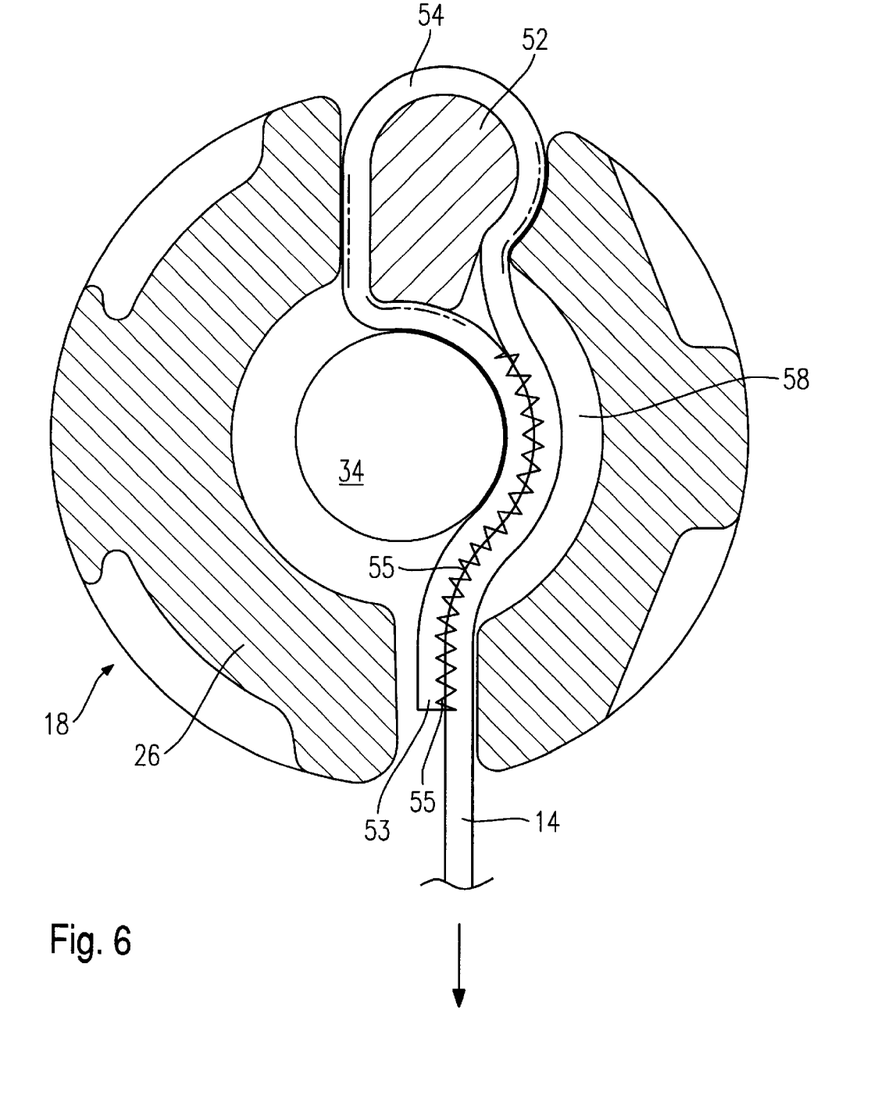
FIG. 6 shows a cross-section through a belt spool according to a third embodiment of the invention.
Figure 7:
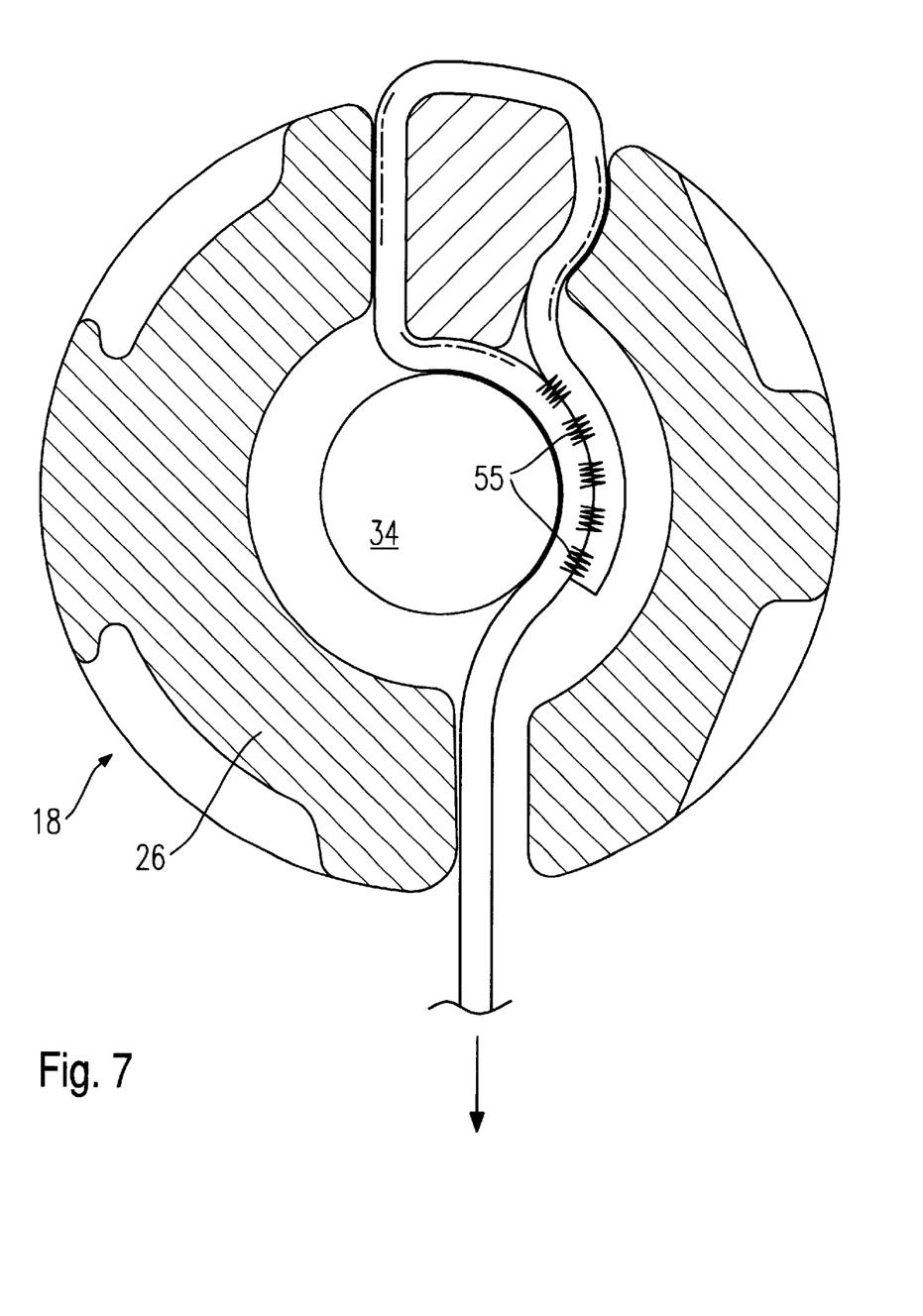
FIG. 7 shows a cross-section through a belt spool according to a fourth embodiment of the invention.

FIGS. 6 and 7 show a shaped part with a cross-section that leads to a clamping effect between the shaped part 52 and the spool body 18 as a result of the tensile force of the safety belt 14 on the sections indicated by dot-dashed lines, so that less of a load is exerted on the site 55 that connects the end 53 with the safety belt 14 or, in the ideal case, a connection even becomes completely superfluous. This has the advantage that the safety belt remains more flexible at the connection site 55 and a thickened area of the belt webbing is avoided. Thus, first of all, the safety belt 14 can more easily be threaded past the torsion rod 34 through the open space 58, and secondly, the open space 58 can be configured smaller and consequently the diameter of the spool body 18 can also be reduced.

Figure 3:
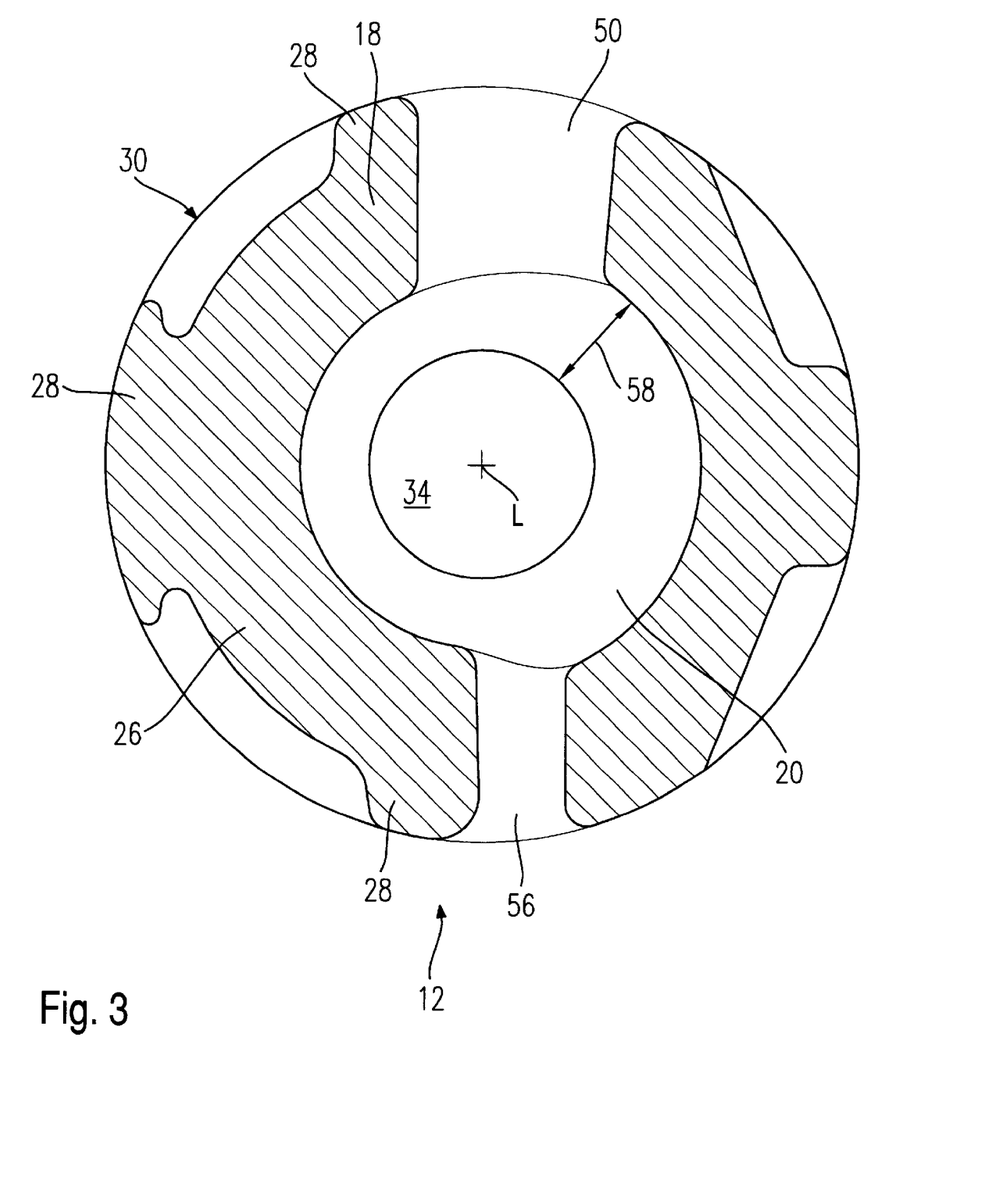
FIG. 3 shows a cross-section through the belt spool of FIG. 2 with a belt webbing attached therein.
Figure 4:
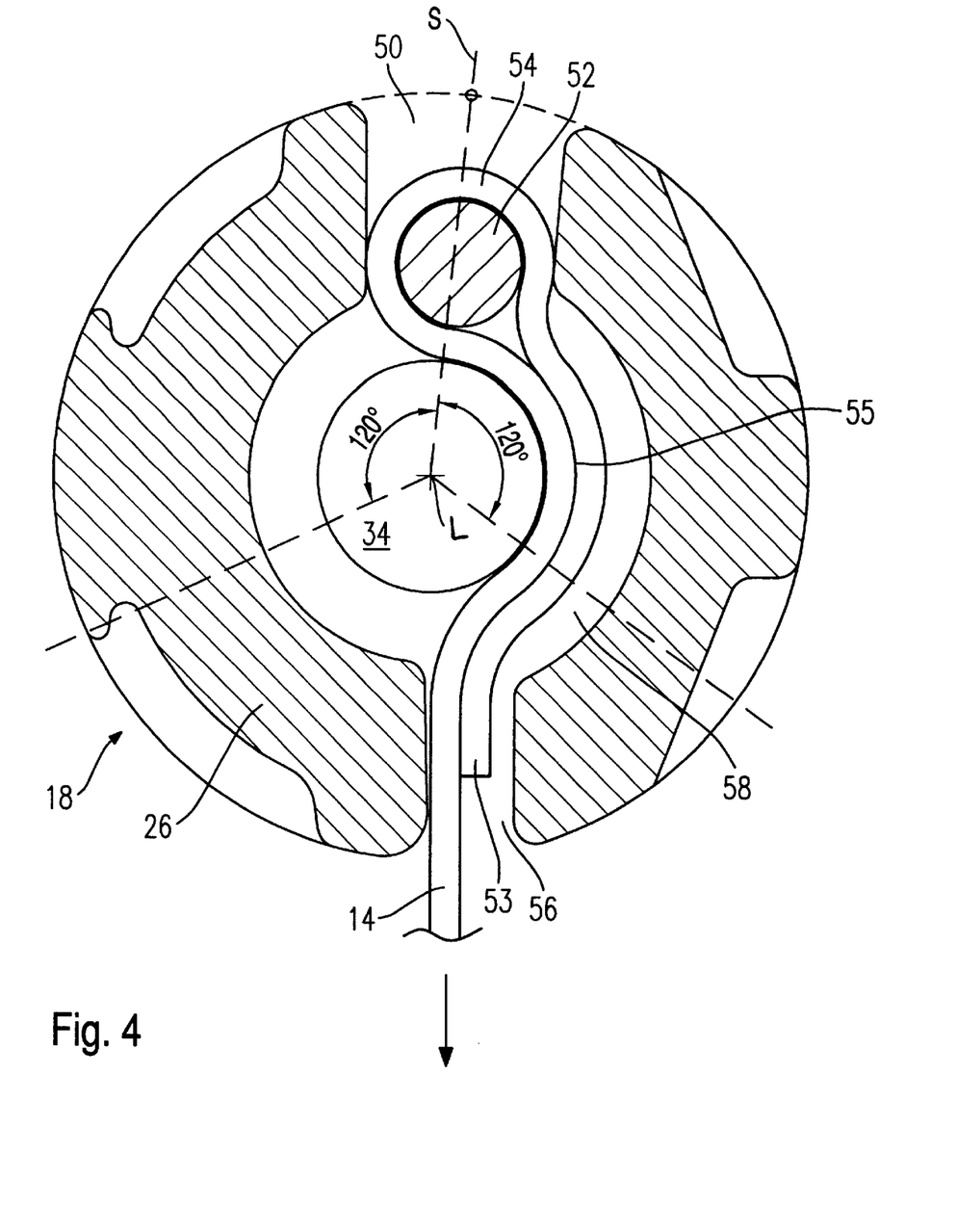
FIG. 4 shows a cross-section through the belt spool of FIG. 2 without the belt webbing.
Figure 5:
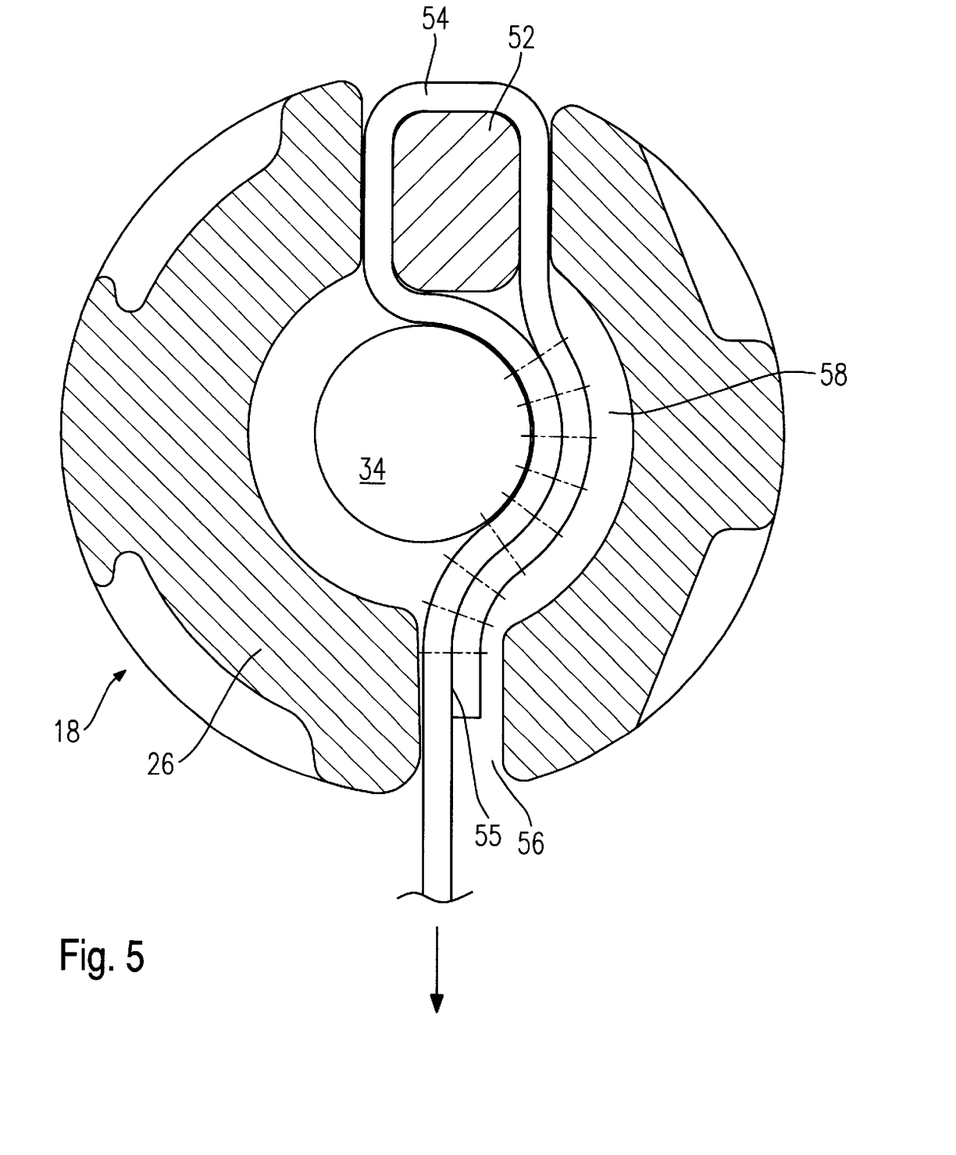
FIG. 5 shows a cross-section through a belt spool according to a second embodiment of the invention.

As can be seen in FIG. 2, the axle section 40 of the torsion rod 34 is provided with a diameter that is smaller than the diameter of the hub sections 36 and 38. Furthermore, the ends of the shaped part 52 each have support noses 60 with which the shaped part 52 is supported on the hub sections 36 and 38 of the torsion rod 34. This prevents the shaped part 52 from being supported in the middle of the torsion rod 34 on the axle section 40, thereby interfering with the torsion possibility of the torsion rod 34. In order to achieve this effect, it is also possible to implement only one of the described measures, that is to say, either only the support noses 60 on the shaped part 52 or else the different diameters of the axle section 40 and the hub sections 36 and 38, respectively During the assembly of the belt spool 12, the loop 54 is threaded through the slot 56 so that it runs past the torsion rod 34, through the hollow space 20 and back out again through the recess 50 In order to facilitate the threading, the open space 58 can be enlarged on one side of the torsion rod 34, as is shown in FIG. 3. The shaped part 52 can be laid into the open loop 54 that projects from the recess 50 and the shaped part 52 can be clamped in the recess 50 by tensioning the safety belt 14.

Figure 8:
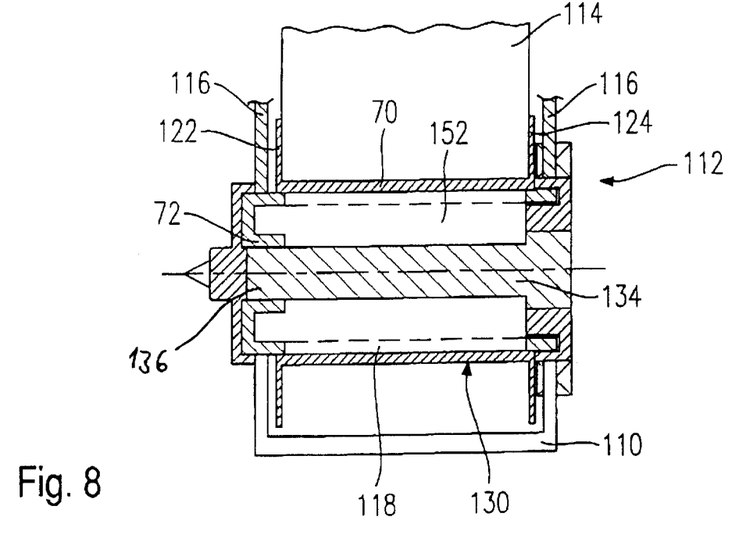
FIG. 8 shows a lengthwise section through a belt retractor according to a fifth embodiment of the invention.
Figure 9:
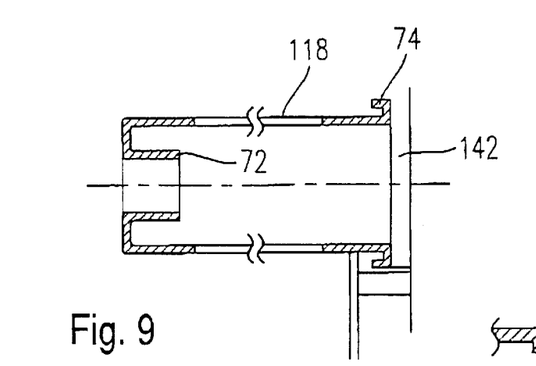
FIG. 9 shows a lengthwise section through the carrier part of the belt spool of FIG. 8.
Figure 10:
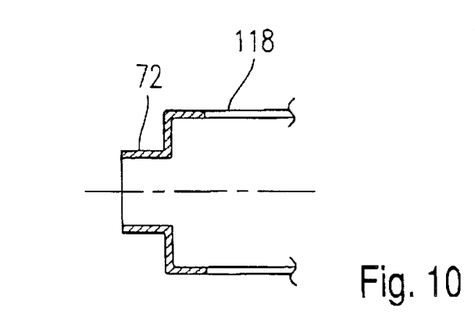
FIG. 10 shows a lengthwise section through a carrier part for a belt spool according to the invention.

FIG. 8 shows another embodiment in which reference numerals increased by 100 are used for already known components. Here, the belt spool 112 consists of a spool body 118, for example, made of a thin-walled steel tube as the load-bearing element which is surrounded by a jacket 70 made of a lightweight and inexpensive material, for example, plastic. Advantageously, the flanges 122 and 124 can also be formed by the jacket 70 which can be manufactured, for instance, by applying it onto the spool body 118 by injection-molding, so that the jacket 70 and the spool body 118 cannot be separated from each other autonomously At one end of the spool body 118, there is formed a bushing 72 into which the first hub section 136 of the torsion rod 134 is non-rotatably pressed FIGS. 9 and 10 show two alternatives for the configuration of the bushing 72, the bushing 72 being provided so as to project into the inside of the spool body 118 (FIG. 9) or out of the spool body 118 (FIG. 10). On the opposite end of the spool body 118, the edge is flanged so that a terminating bead 74 is formed on which the locking wheel 142 is rotatably supported Advantageously, the spool body 118 is provided with radial reinforcement beads 76, so that it can withstand the constricting forces of the safety belt 114

The torsion rod 134 becomes elongated under torsion, thus exerting axial forces on the locking wheel 142. In order to prevent the locking wheel 142 from becoming detached from the spool body 118 as a result of these forces, an excess of material 78 cast onto the locking wheel 142 can be flanged into a reinforcement bead 76' located near the edge of the spool body 118.

Figure 11:
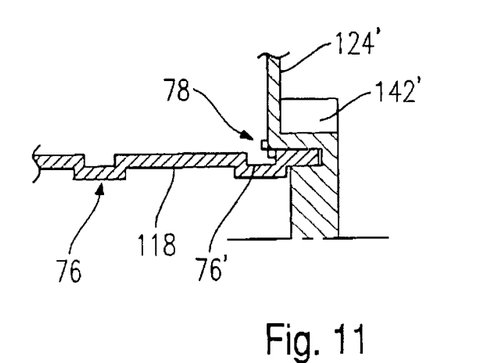
FIG. 11 shows an enlarged cross-section of a part of a sixth embodiment of the belt spool according to the invention.

Advantageously, the second flange 124' can also be formed directly on the locking wheel 142' so that the flange 124' and the locking wheel 142' form one component.

Figure 12:
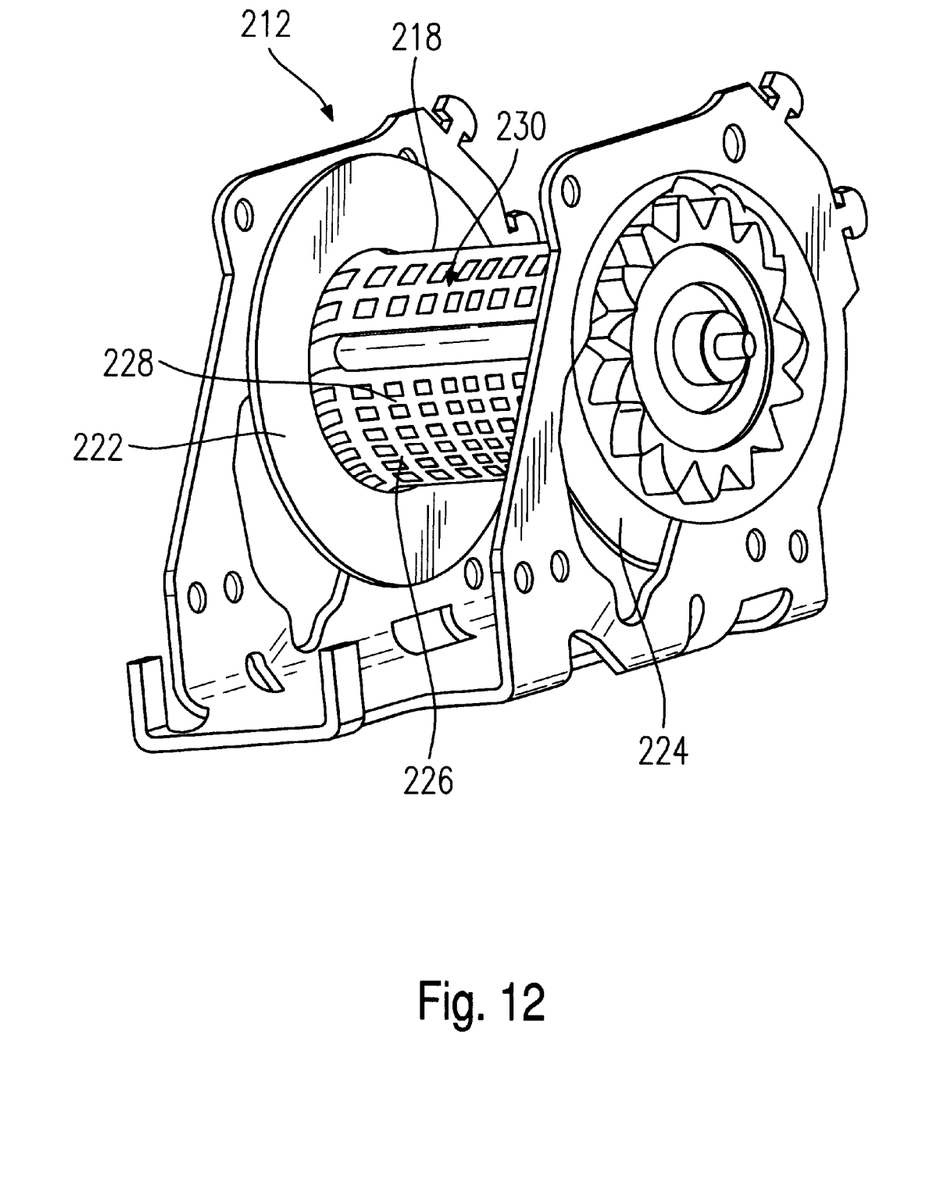
FIG. 12 is a perspective view of a belt retractor according to a seventh embodiment of the invention.

FIG. 12 shows another embodiment in which reference numerals increased by 200 are used for already known components. Here, the belt spool 212 consists of a spool body 218 made of zinc diecasting, the flanges 222, 224 being cast on The base body 226 has a grid structure of ribs 228 arranged at right angles to each other, forming a drum surface 230 Here, 80% of all of the ribs 228 are narrower than 1.6 mm. As a result, the spool body can weigh less than 150 g. As an alternative, the base body 226 can also have a honeycomb structure instead of a grid structure.

What is claimed is:

1. A belt spool for a belt retractor, said belt spool comprising a torsion rod and a spool body that has a recess in which is provided a shaped part by means of which an end of a safety belt can be fastened in said recess, said shaped part resting at said torsion rod in order to be supported by said torsion rod when said shaped part is stressed by a tensile load of said safety belt.

2. The belt spool according to claim 1, wherein said torsion rod has two hub sections by means of which it engages said spool body, and an axle section that connects said two hub sections to each other, said shaped part being only supported on said torsion rod at said hub sections.

3. The belt spool according to claim 2, wherein said axle section of said torsion rod has a smaller diameter than said hub sections.

4. The belt spool according to claim 2, wherein said shaped part has two ends that each bear a support nose by means of which it is supported on said hub sections of said torsion rod.

5. The belt spool according to claim 1, wherein said spool body has a load-bearing element made of metal that is surrounded by a jacket made of plastic.

6. The belt spool according to claim 5, wherein said jacket is applied to said load-bearing element by means of injection-molding.

7. The belt spool according to claim 1, wherein said spool body is made of zinc diecasting and weighs less than 150 g.

8. 8 The belt spool according to claim 7, wherein said spool body has one of a grid and honeycomb structure.

9. The belt spool according to claim 8, wherein said grid and honeycomb structure, respectively, is made up of ribs of which 80% are narrower than 1.6 mm.

10. A belt retractor comprising a safety belt and a belt spool, said belt spool comprising a torsion rod and a spool body that has a recess in which is provided a shaped part by means of which an end of a safety belt can be fastened in said recess, said shaped part resting at said torsion rod in order to be supported by said torsion rod when said shaped part is stressed by a tensile load of said safety belt, said end of said safety belt forming a loop that surrounds said shaped part.

11. The belt retractor according to claim 10, wherein said end of said safety belt is welded in order to form said loop.

12. The belt retractor according to claim 10, wherein said end of said safety belt is glued in order to form said loop.

13. The belt retractor according to claim 10, wherein a first imaginary line through an intersection point of a center line of said recess with a circumferential line of said belt spool and a center line of said belt spool is one of a line through a cross-section of said shaped part and a line which is at least a tangent to said cross-section of said shaped part.

14. The belt retractor according to claim 13, wherein a distance between said first imaginary line and a parallel tangent to a circumference of said shaped part is larger than 1 mm.

15. The belt retractor according to claim 13, wherein a slot is provided where said safety belt exits said belt spool, said slot being provided so as to be approximately diametrically opposed to said recess.

16. The belt retractor according to claim 15, wherein a center line of said slot forms a second imaginary line which is rotated with respect to said first imaginary line by at least 120°.

17. The belt retractor according to claim 10, wherein a projected supporting width of said shaped part is at least 7 mm, a belt deflector being not provided in said safety belt system.

18. The belt retractor according to claim 17, wherein said projected supporting width of said shaped part is at least 5.5 mm and the strength of said shaped part is at least 900 N/mm$^2$.

19. The belt retractor according to claim 10, wherein a projected supporting width of said shaped part is at least 9 mm, a belt deflector being provided in said safety belt system.

20. The belt retractor according to claim 19, wherein said projected width of said shaped part is at least 7 mm and the strength of said shaped part is at least 900 N/mm$^2$.

* * * * *

UNITED STATES PATENT AND TRADEMARK OFFICE
CERTIFICATE OF CORRECTION

PATENT NO. : 6,732,966 B2 Page 1 of 1
DATED : May 11, 2004
INVENTOR(S) : Franz Wier It is certified that error appears in the above-identified patent and that said Letters Patent is hereby corrected as shown below:

Column 5,
Line 13, after "8" delete -- 8 --.

Signed and Sealed this

Twenty-eighth Day of September, 2004

JON W. DUDAS
*Director of the United States Patent and Trademark Office*